US009965830B2

(12) United States Patent
Hanamoto

(10) Patent No.: US 9,965,830 B2
(45) Date of Patent: May 8, 2018

(54) IMAGE PROCESSING APPARATUS, IMAGE PROCESSING METHOD, AND PROGRAM

(71) Applicant: CANON KABUSHIKI KAISHA, Tokyo (JP)

(72) Inventor: Takashi Hanamoto, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 209 days.

(21) Appl. No.: 14/962,996

(22) Filed: Dec. 8, 2015

(65) Prior Publication Data

US 2016/0170488 A1 Jun. 16, 2016

(30) Foreign Application Priority Data

Dec. 12, 2014 (WO) .................. PCT/JP2014/082982

(51) Int. Cl.
*G09G 5/00* (2006.01)
*G06T 3/40* (2006.01)
(Continued)

(52) U.S. Cl.
CPC .............. *G06T 3/40* (2013.01); *G02B 27/017* (2013.01); *G06F 3/011* (2013.01); *G06T 15/04* (2013.01);
(Continued)

(58) Field of Classification Search
CPC ....... G06T 3/40; G06T 15/04; G06T 2210/36; G06T 2215/12; G06T 2215/16;
(Continued)

(56) References Cited

U.S. PATENT DOCUMENTS

2003/0142872 A1 7/2003 Koyanagi
2014/0361977 A1* 12/2014 Stafford ............ G02B 27/0093 345/156

(Continued)

FOREIGN PATENT DOCUMENTS

JP 11-153987 A 6/1999
JP 2000-011151 A 1/2000

(Continued)

*Primary Examiner* — Peter D McLoone
(74) *Attorney, Agent, or Firm* — Canon U.S.A., Inc. IP Division

(57) ABSTRACT

Provided is an image processing apparatus, for displaying image data in accordance with a line-of-sight direction of a viewer, that includes: storage means for storing a plurality of environment maps having different resolutions; obtaining means for obtaining as motion information of the viewer; retaining means for retaining a current area that is being displayed; target area determination means for determining a target area on the basis of the current area and the motion information; path area determination means for determining as a path area an area that includes a path, from the current area to the target area, along which the line-of-sight direction changes; setting means for setting resolutions that respectively correspond to the path area and the target area; and generation means for reading pieces of image data that respectively correspond to the path area and the target area from environment maps having the resolutions set by the setting means, and for generating image data for display in the path area and image data for display in the target area.

18 Claims, 12 Drawing Sheets

601
603
602

(51) Int. Cl.
*G02B 27/01* (2006.01)
*G06F 3/01* (2006.01)
*G06T 15/04* (2011.01)

(52) U.S. Cl.
CPC .................. *G02B 2027/014* (2013.01); *G02B 2027/0147* (2013.01); *G02B 2027/0187* (2013.01); *G06T 2210/36* (2013.01); *G06T 2215/12* (2013.01); *G06T 2215/16* (2013.01)

(58) Field of Classification Search
CPC ............ G02B 27/017; G02B 2027/014; G02B 2027/0147; G02B 2027/0187; G06F 3/011
See application file for complete search history.

(56) References Cited

U.S. PATENT DOCUMENTS

2014/0375680 A1* 12/2014 Ackerman ............ G06T 19/006 345/633
2016/0065946 A1* 3/2016 Cole .................. H04N 13/0014 348/43

FOREIGN PATENT DOCUMENTS

| | | | |
|---|---|---|---|
| JP | 2001-337645 | A | 12/2001 |
| JP | 2003-224846 | A | 8/2003 |
| JP | 2004-199291 | A | 7/2004 |
| JP | 2013-093705 | A | 5/2013 |
| JP | 2013-254251 | A | 12/2013 |

* cited by examiner

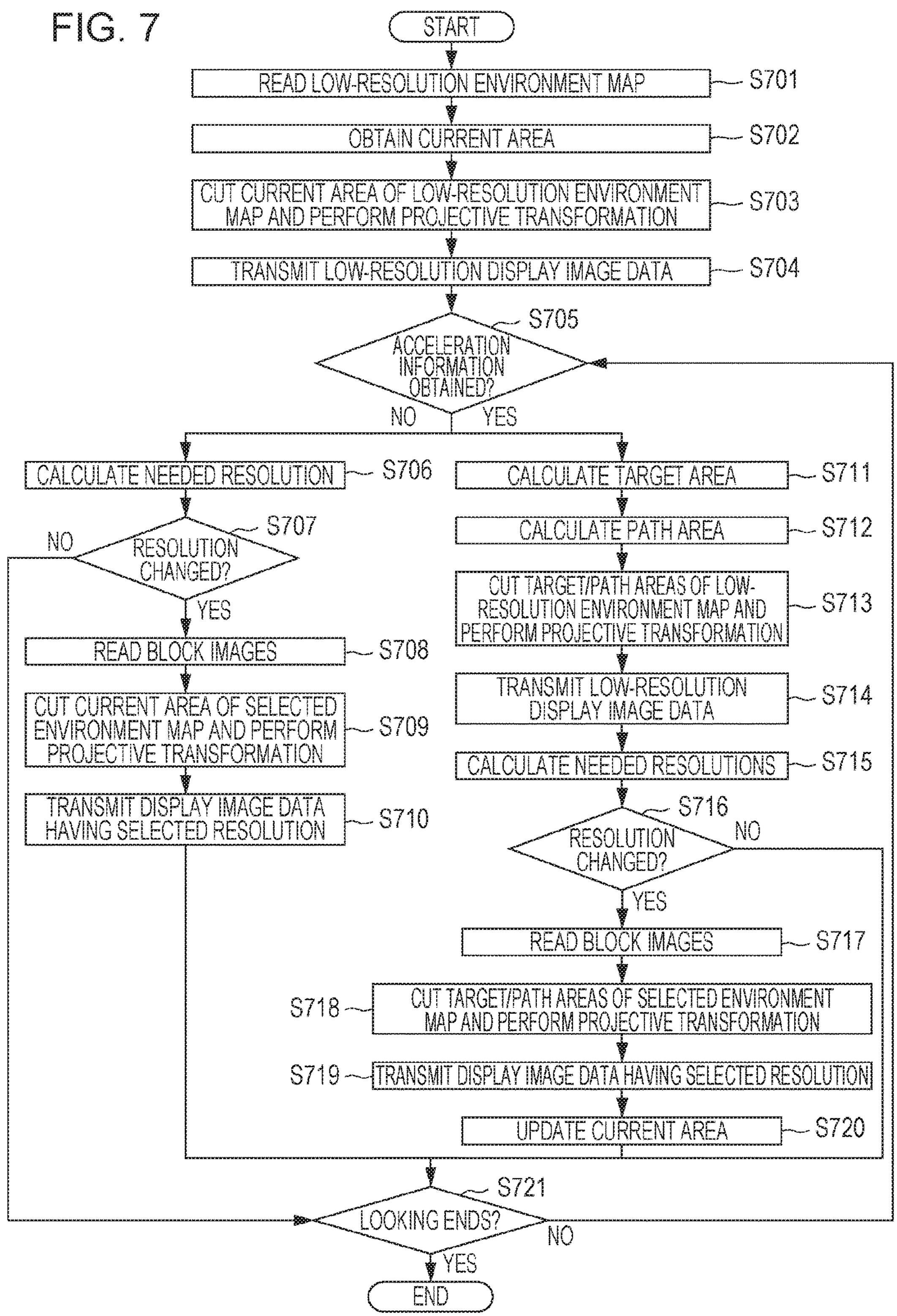
FIG. 7
START
READ LOW-RESOLUTION ENVIRONMENT MAP
S701
OBTAIN CURRENT AREA
S702
CUT CURRENT AREA OF LOW-RESOLUTION ENVIRONMENT MAP AND PERFORM PROJECTIVE TRANSFORMATION
S703
TRANSMIT LOW-RESOLUTION DISPLAY IMAGE DATA
S704
ACCELERATION INFORMATION OBTAINED?
S705
NO
YES
CALCULATE NEEDED RESOLUTION
S706
RESOLUTION CHANGED?
S707
NO
YES
READ BLOCK IMAGES
S708
CUT CURRENT AREA OF SELECTED ENVIRONMENT MAP AND PERFORM PROJECTIVE TRANSFORMATION
S709
TRANSMIT DISPLAY IMAGE DATA HAVING SELECTED RESOLUTION
S710
CALCULATE TARGET AREA
S711
CALCULATE PATH AREA
S712
CUT TARGET/PATH AREAS OF LOW-RESOLUTION ENVIRONMENT MAP AND PERFORM PROJECTIVE TRANSFORMATION
S713
TRANSMIT LOW-RESOLUTION DISPLAY IMAGE DATA
S714
CALCULATE NEEDED RESOLUTIONS
S715
RESOLUTION CHANGED?
S716
NO
YES
READ BLOCK IMAGES
S717
CUT TARGET/PATH AREAS OF SELECTED ENVIRONMENT MAP AND PERFORM PROJECTIVE TRANSFORMATION
S718
TRANSMIT DISPLAY IMAGE DATA HAVING SELECTED RESOLUTION
S719
UPDATE CURRENT AREA
S720
LOOKING ENDS?
S721
NO
YES
END

IMAGE PROCESSING APPARATUS, IMAGE PROCESSING METHOD, AND PROGRAM

BACKGROUND

Technical Field

The present invention relates to an image processing technique for displaying image data on a head-mounted display and the like.

Background Art

A technique for a viewer to look at an image by using a head-mounted display (also referred to herein as an HMD) that is fixed to the viewer's head is known. Further, eyewear displays and the like are currently known. Image data displayed on an HMD is cut from an image in all directions on each occasion, and the image, which serves as the source, is also called an environment map. An environment map can be obtained by using a method of image capturing with a fisheye lens or a method of capturing an image of light reflected from a mirror ball with a camera, for example.

Japanese Patent Laid-Open No. 2013-254251 discloses a method of detecting an action of a viewer by using a sensor built in an HMD, scrolling a displayed image in accordance with an operation corresponding to a motion of the viewer's head, and displaying the image.

As a result of the recent increasingly higher resolution of display images, the volume of image data needed for display becomes larger, and reading and decoding of image data for display on an HMD takes longer. Therefore, with the method disclosed in Japanese Patent Laid-Open No. 2013-254251, even if a viewer moves their head to face a direction in which the viewer wants to look, image data that the viewer wants to look at might not be smoothly displayed.

SUMMARY

Some embodiments of the image processing apparatus, image processing method, and program more naturally display image data corresponding to the line-of-sight of a viewer in accordance with a motion of the viewer by predicting an area to be looked at on the basis of the motion of the viewer.

Some embodiments provide an image processing apparatus for displaying image data in accordance with a line-of-sight direction of a viewer, including: storage means for storing a plurality of environment maps having different resolutions; obtaining means for obtaining information indicating a motion of the viewer as motion information; retaining means for retaining a current area that is being displayed to the viewer; target area determination means for determining a target area on the environment maps on the basis of the current area and the motion information; path area determination means for determining as a path area an area that includes a path, from the current area to the target area, along which the line-of-sight direction changes; setting means for setting resolutions that respectively correspond to the path area and the target area among the resolutions of the plurality of environment maps; and generation means for reading pieces of image data that respectively correspond to the path area and the target area from environment maps having the resolutions set by the setting means, and for generating image data for display in the path area and image data for display in the target area.

Further features of the apparatuses, methods, and programs will become apparent from the following description of exemplary embodiments with reference to the attached drawings.

BRIEF DESCRIPTION OF THE DRAWINGS

FIG. 7 is a flowchart of a high-resolution environment map look-ahead process.

DETAILED DESCRIPTION

Hereinafter, preferred embodiments of the present invention will be described with reference to the attached drawings. Note that a configuration illustrated in the following embodiments is merely an example, and the present invention is not limited to the illustrated configuration.

First Embodiment

Overall Configuration

In a first embodiment, an image processing apparatus for reading any of a plurality of environment maps having respective resolutions in accordance with acceleration information for display on a head-mounted display (HMD) will be described, for example. Note that the present invention is applicable not only to HMDs but also to similar apparatuses, such as eyewear displays.

Figure 1:
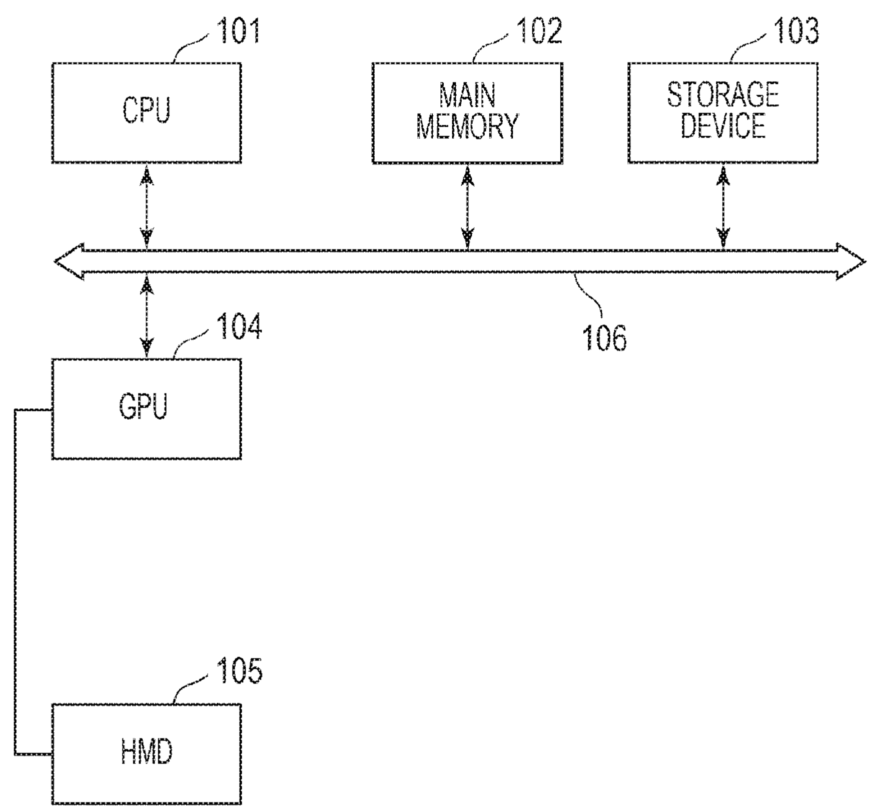
FIG. 1 is a block diagram illustrating a configuration of an image processing apparatus.

FIG. 1 is a block diagram illustrating a hardware configuration of an image processing apparatus applicable to the first embodiment. The image processing apparatus includes a CPU 101, a main memory 102, a storage device 103, a GPU 104, and a bus 106. First, the CPU 101 performs arithmetic processing and executes various programs. The main memory 102 retains programs and data needed for image processing. The main memory 102 is also used as a workspace for image processing performed by the CPU 101. The storage device 103 is a device that stores an image processing program and a plurality of pieces of image data, and a hard disk drive (HDD) may be used as the storage device 103, for example. The GPU 104 is connected to an HMD 105, which is an external display device for displaying image data and a GUI, via an I/F unit (not illustrated). Image data to be displayed is loaded to the GPU 104, and the GPU 104 transfers the image data to the HMD 105. Note that the I/F connecting the GPU 104 and the HMD 105 with each other enables data exchange using infrared communication, a wireless LAN, and so on, for example. The bus 106 is a bus that connects the above-described components with one another. Additionally, some embodiments may include various components other than those described above.

Figure 2A:
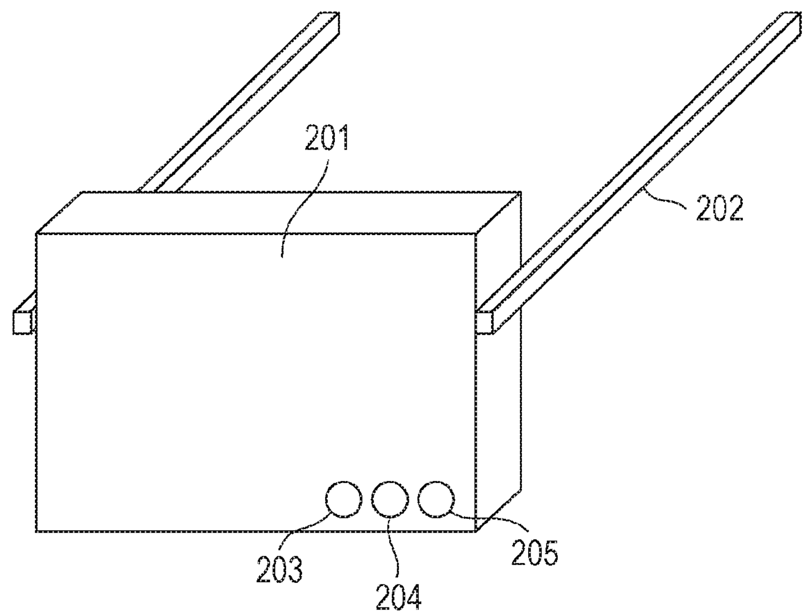
FIGS. 2A and 2B are diagrams illustrating a configuration of a head-mounted display (HMD).

FIG. 2A includes diagrams schematically illustrating a configuration of the HMD 105. As illustrated in FIG. 2A, the HMD 105 includes a display unit 201, and the display unit 201 is equipped with an acceleration sensor 203, a geomagnetic sensor 204, and a GPS sensor 205. The acceleration sensor 203, the geomagnetic sensor 204, and the GPS sensor 205 are sensors for obtaining motion information that indicates a motion of a viewer who is wearing the HMD 105. The acceleration sensor 203 detects an acceleration in a lateral direction in which the viewer's head moves right and left and that in a vertical direction in which the viewer's head moves up and down, and outputs the accelerations as acceleration information. The geomagnetic sensor 204 calculates the azimuth of the HMD 105 by detecting the orientation of the earth's magnetic field and outputs angle information that indicates the direction in which the viewer is looking. The GPS (global positioning system) sensor 205 determines the position of the HMD 105 on earth and obtains position information. A fixing unit 202 is a unit for fixing the display unit 201 to the viewer's head and has a structure such that the viewer can put the fixing unit 202 over their ears. That is, the sensors built in the display unit 201 detect the position and direction in conjunction with a motion of the viewer's head.

Figure 2B:
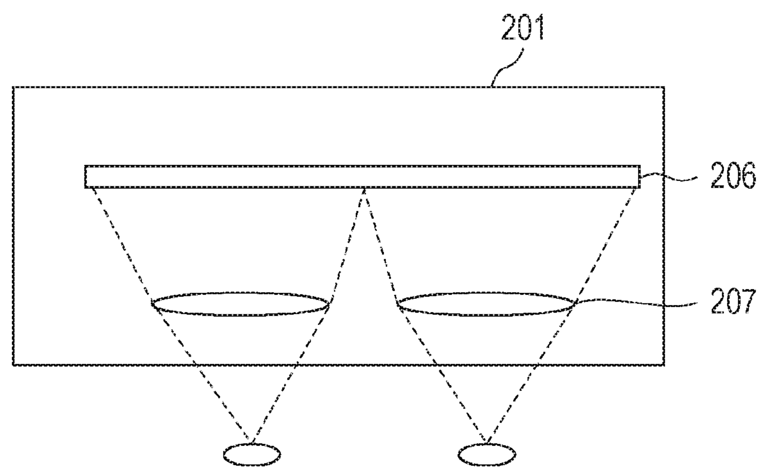

FIG. 2B illustrates a further detailed configuration of the display unit 201. FIG. 2B schematically illustrates an internal configuration of the display unit 201 when the HMD 105 illustrated in FIG. 2A is viewed from above. The display unit 201 has a structure in which a liquid crystal display 206 can cover the entire field of view of the viewer through lenses 207. The liquid crystal display 206 displays image data. On the liquid crystal display 206, image data obtained by cutting part of an environment map that is formed of an image in all directions is displayed. Accordingly, the viewer can look at a realistic image with which the viewer feels like they are at the center position of the environment map. The displayed image data is transferred from an image processing apparatus 400.

Figure 3A:
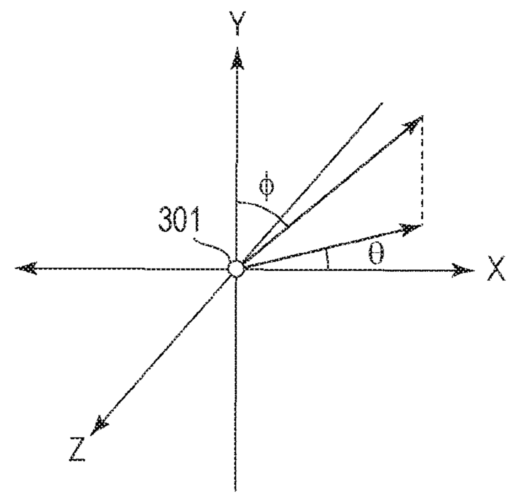
FIGS. 3A to 3C are diagrams illustrating a configuration of an environment map.
Figure 3B:
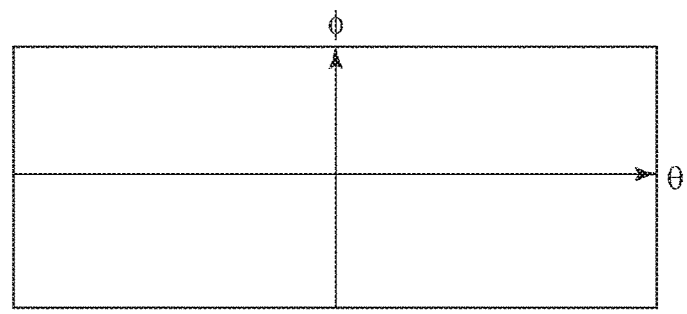
Figure 3C:
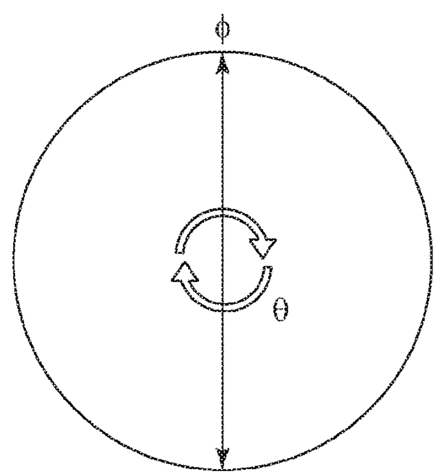

FIG. 3 includes diagrams for describing an environment map. FIG. 3A illustrates a coordinate system of an environment map relative to a viewpoint position. As illustrated in FIG. 3A, a line-of-sight direction from a viewpoint position 301 of the viewer can be expressed by polar coordinates (θ, φ). An environment map is obtained by quantizing these polar coordinates (θ, and replacing information about the quantized polar coordinates (θ, φ) with image data. An environment map is also called an omnidirectional image or a full-dome image. Each pixel that constitutes an environment map has a brightness vector. The magnitude of the brightness vector represents the brightness value, and the direction of the brightness vector is always directed toward the viewpoint position. That is, an environment map is brightness information from surroundings incident on the viewpoint position 301 of the viewer. As a data scheme for retaining an environment map, an equidistant cylindrical mapping method illustrated in FIG. 3B, a sphere mapping method illustrated in FIG. 3C, and the like are available. In the equidistant cylindrical mapping method illustrated in FIG. 3B, θ is represented by the horizontal axis, φ is represented by the vertical axis, and an environment map is converted into two-dimensional rectangular image data to thereby retain brightness information. In the sphere mapping method illustrated in FIG. 3C, φ on an environment map is represented by the axis directed from the center of the circle to the arc, θ on the environment map is represented by the rotation direction about the center of the circle, and the environment map is converted into two-dimensional circle image data to thereby retain brightness information. Note that in both the equidistant cylindrical mapping method and the sphere mapping method, a spherical environment map is projected on a plane, and therefore, a distortion occurs. Accordingly, in both methods, a projective transformation needs to be performed in a case of generating image data to be displayed on an HMD.

Configuration of Image Processing Apparatus

Figure 4:
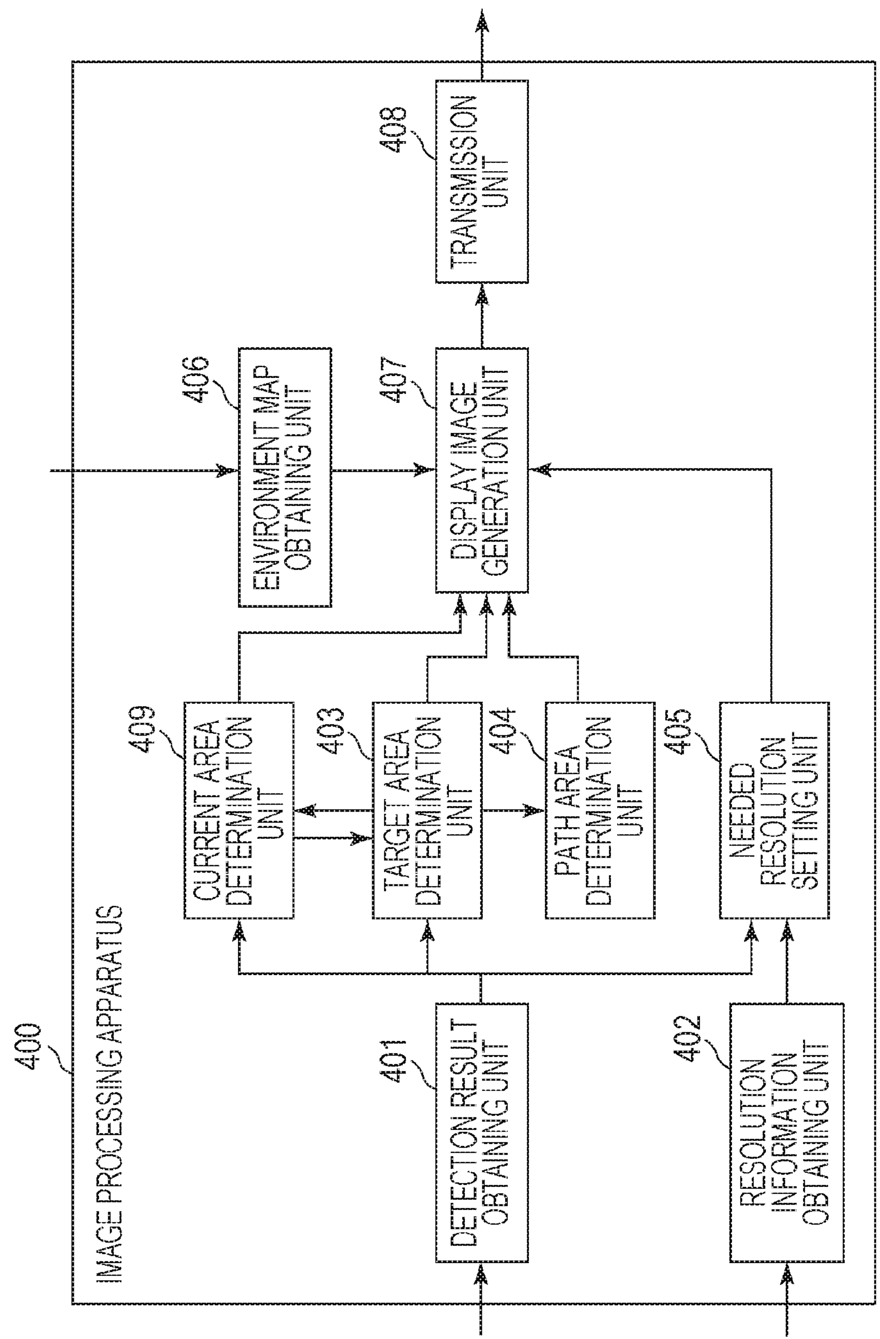
FIG. 4 illustrates a detailed configuration of an embodiment of the image processing apparatus.

FIG. 4 illustrates a detailed configuration of the image processing apparatus 400 applicable to the first embodiment. In this embodiment, a form in which each illustrated component is implemented using software will be described.

Figure 5:
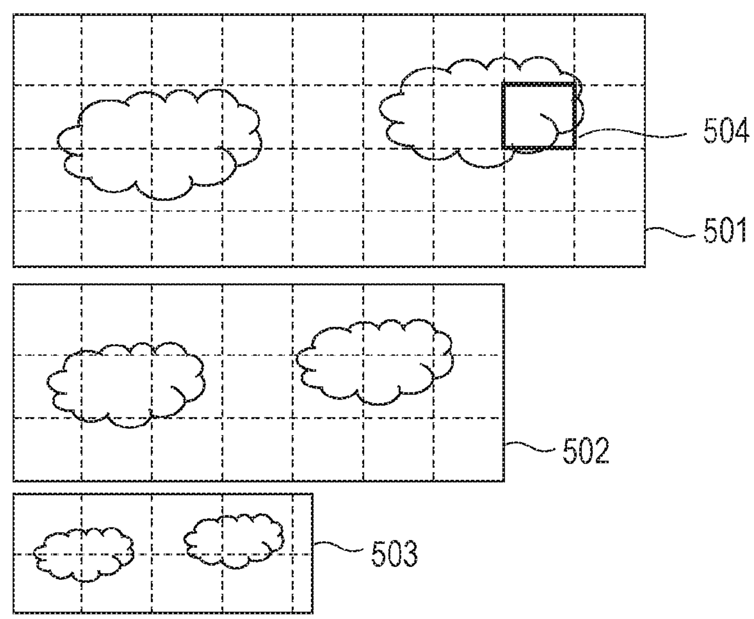
FIG. 5 illustrates a plurality of environment maps.

The image processing apparatus 400 in this embodiment cuts candidate image data to be displayed from any of a plurality of environment maps having respective resolutions stored in the storage device 103 in accordance with an operation of the HMD 105 and generates display image data. FIG. 5 illustrates the plurality of environment maps. As the environment maps in this embodiment, three environment maps having different resolutions, that is, a high-resolution environment map 501, a medium-resolution environment map 502, and a low-resolution environment map 503 are retained. It is assumed that the environment maps in this embodiment are based on the equidistant cylindrical mapping method. The environment maps having respective resolutions are each divided into block images, for example, a block image 504, and are saved in the storage device 103 as different files respectively. Therefore, the image processing apparatus 400 can read block images having a needed resolution.

Figure 6A:
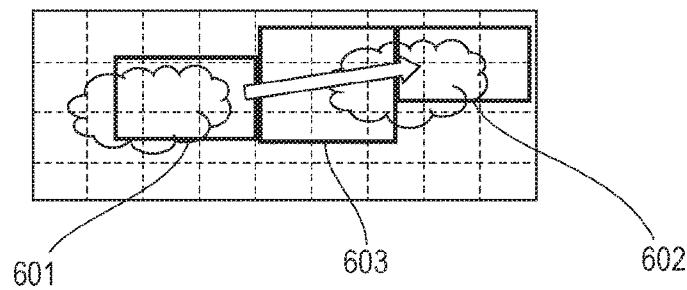
FIG. 6A illustrates a diagram for describing a current area.

A detection result obtaining unit 401 obtains from the HMD 105 motion information, such as acceleration information detected by the acceleration sensor 203 and angle information detected by the geomagnetic sensor 204. A current area determination unit 409 identifies as a current area 601 (see FIG. 6A) an area that the viewer is currently looking at on the basis of the angle information. FIG. 6A illustrates a diagram for describing a current area.

A target area determination unit 403 obtains the position of the current area from the current area determination unit 409. Further, when obtaining new acceleration information, the target area determination unit 403 predicts a direction in which the viewer is to look, the direction being relative to the current area 601, and determines a target area 602, as illustrated in FIG. 6A.

A path area determination unit 404 determines a path area 603 (see FIG. 6A) on the basis of the current area 601 and the target area 602 after the target area 602 has been determined. The path area 603 is an area that enters the viewer's field of view during a period until the line-of-sight moves to the target area 602 that the viewer is to look at.

A resolution information obtaining unit 402 obtains as resolution information a resolution at which display on the display unit 201 of the HMD 105 is possible. A needed resolution setting unit 405 calculates a needed resolution for display image data to be transmitted next on the basis of the acceleration information obtained from the detection result obtaining unit 401 and the resolution information obtained from the resolution information obtaining unit 402. Specifically, the resolution information obtaining unit 402 sets a needed resolution for image data to be displayed in the path area in accordance with accelerations in two directions which are indicated by the acceleration information, and sets a needed resolution for image data to be displayed in the target area in accordance with the resolution information.

A display image generation unit 407 takes an environment map having a resolution for display from among environment maps stored in an environment map obtaining unit 406, cuts an area, and performs a projective transformation on the cut environment map to thereby generate display image data. Among pieces of display image data that are displayed in an area of the same size, a piece of image data generated by performing cutting from an environment map having a higher resolution has a larger data volume, and transfer of the data takes longer. The display image generation unit 407 in this embodiment generates display image data from an environment map having the lowest resolution first when the viewer starts looking at an image. The display image generation unit 407 thereafter generates display image data in accordance with a motion of the HMD 105. In a case where a motion of the HMD 105 is detected, the display image generation unit 407 generates display image data for display in the path area (e.g., path area 603 in FIG. 6A) and display image data for display in the target area and outputs the pieces of data sequentially. It is assumed that, for the display image generation unit 407, the size of image data to be displayed on the display unit 201 of the connected HMD 105 (the angle-of-view information) is set in advance.

A transmission unit 408 transfers the pieces of display image data for display on the display unit 201 toward the HMD 105.

Flow of Process in Image Processing Apparatus

A flow of process in the image processing apparatus 400 will be described with reference to FIG. 7. The CPU 100 reads from the main memory 102 a program corresponding to the flowchart illustrated in FIG. 7 and executes the program to thereby implement the image processing apparatus 400.

First, when a viewer wears the HMD 105 and starts looking, the environment map obtaining unit 406 reads the low-resolution environment map 503 from the storage device 103 and loads the low-resolution environment map 503 to the main memory 102 in step S701.

In step S702, the current area determination unit 409 determines a current area that the viewer is currently observing on the basis of angle information (θ, φ) which the detection result obtaining unit 401 obtains from the geomagnetic sensor 204 of the HMD 105 and angle-of-view information about the display unit 201 which is retained in advance. As described above, on an environment map, brightness information for each angle is retained in advance. Accordingly, in this embodiment, the angle information (θ, φ) is associated with the coordinate system of the environment map, and an area corresponding to the angle-of-view is set to thereby set the current area 601.

In step S703, the display image generation unit 407 refers to the low-resolution environment map 503, cuts the current area, and performs a projective transformation for displaying brightness information about the cut area on the display unit 201 of the HMD 105. Low-resolution display image data generated by the display image generation unit 407 is transferred to the HMD 105 via the transmission unit 408. The low-resolution environment map has already been loaded to the main memory 102, and therefore, processing can be performed quickly. Further, the low-resolution environment map has a smaller data volume, and the processing load is not high. Therefore, image data for an area that the viewer looks at can be displayed quickly.

In step S705, the detection result obtaining unit 401 determines whether new acceleration information (aθ, aφ) has been obtained from the acceleration sensor 203 of the HMD 105. If the acceleration information has not been updated, the flow proceeds to step S706. If new acceleration information has been obtained, the flow proceeds to step S711. Note that the detection result obtaining unit 401 may obtain acceleration information (aθ, aφ) at a predetermined time interval, and the flow may proceed to step S706 if (aθ, aφ)=(0, 0) or may proceed to step S711 if (aθ, aφ)≠(0, 0).

In step S706, a case where the acceleration information (aθ, aφ) has not been obtained after transmission of display image data for the current area 601 means that the viewer's head has not moved and that the viewer keeps looking at the same current area 601. Then, the needed resolution setting unit 405 calculates a resolution at which display in the current area 601 is possible and for which display image data needs to be newly generated. The needed resolution setting unit 405 obtains from the resolution information obtaining unit 402 resolution information indicating the highest resolution at which display on the display unit 201 of the HMD 105 is possible. The needed resolution setting unit 405 determines a resolution that is equal to or lower than the highest resolution indicated by the resolution information at which display is possible and that is the highest resolution among those of the environment maps to be a needed resolution.

In step S707, the display image generation unit 407 refers to the needed resolution obtained from the needed resolution setting unit 405 and determines whether display image data having a resolution higher than that of the low-resolution environment map needs to be generated. If the needed resolution is equal to or lower than that of the low-resolution environment map 503, it is not possible to change the resolution, and therefore, the flow proceeds to step S721. If the needed resolution is higher than that of the low-resolution environment map 503, the flow proceeds to step S708.

In step S708, the display image generation unit 407 reads only block images corresponding to the current area 601 from an environment map corresponding to the needed resolution from the storage device 103 and loads the block images to the main memory 102.

In step S709, the display image generation unit 407 cuts the current area 601 from the read block images and performs a projective transformation on the cut image data to thereby generate display image data.

In step S710, the display image generation unit 407 outputs the display image data to the transmission unit 408, and the transmission unit 408 transfers the display image data having a higher resolution to the HMD 105. As a result, the viewer can look at an image having a higher resolution as long as the viewer keeps looking at the current area 601.

Figure 6B:
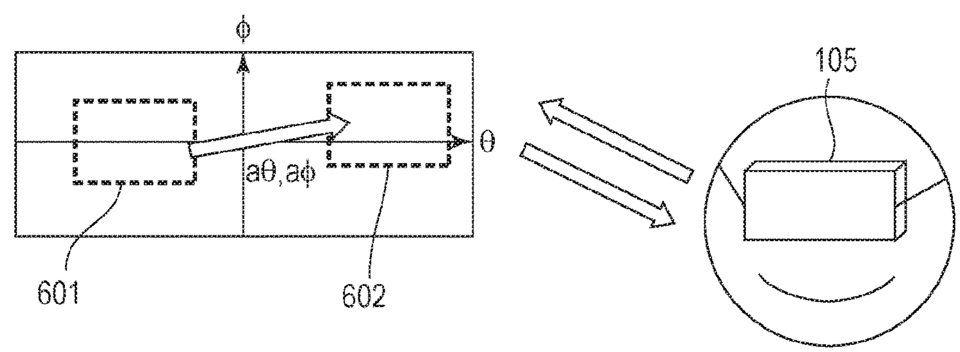
FIG. 6B illustrates a prediction of a motion of a viewer's head from the operation range of the head and from acceleration information.
Figure 6C:
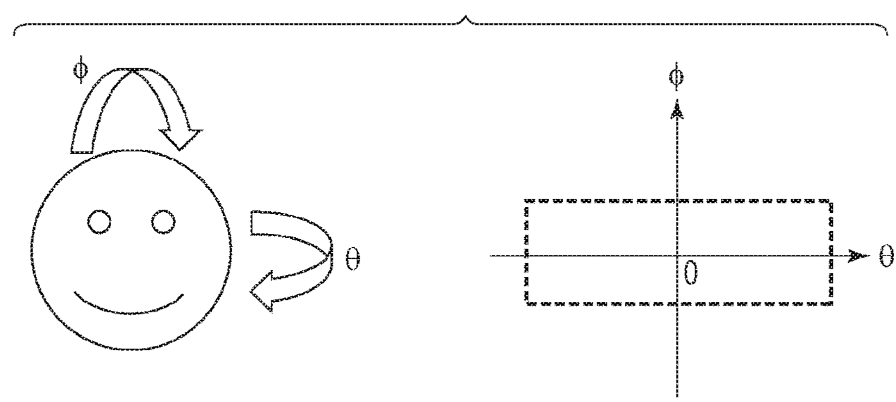
FIG. 6C illustrates the line-of-sight of human beings in a θ direction and in a φ direction.

Next, a process performed in a case where the viewer's head moves, and new acceleration information (aθ, aφ) is obtained from the acceleration sensor 203 of the HMD 105 (or (aθ, aφ)≠(0, 0)) will be described. In step S711, the target area determination unit 403 calculates the target area 602 on the basis of the acceleration information (aθ, aφ). The line-of-sight of human beings is limited by the range of motion in a θ direction and that in a direction due to their structure, as illustrated in FIG. 6C. Therefore, the target area determination unit 403 predicts a motion of the viewer's head from the operation range of the head which is retained in advance and the acceleration information (aθ, aφ), as illustrated in FIG. 6B, and sets the target area 602. The target area is calculated from the amount of movement from the center coordinates (θc, φc) of the current area at the acceleration ($a\theta$, $a\varphi$) for a predetermined time of $\Delta t$ seconds. The center coordinates ($\theta t$, $\varphi t$) of the target area after $\Delta t$ seconds can be calculated as follows:

$$(\theta_t,\varphi_t)=(\theta_c,\varphi_c)+\frac{1}{2}(a\theta,a\varphi)\times\Delta t^2.$$

An area that extends from the center coordinates and fits in the angle-of-view is set. $\Delta t$ is set to one second, which is an average time taken to operate a human head. Note that in a case where ($\theta t$, $\varphi t$) exceeds the range of motion of the head, the target area is reset within the range of motion.

In step S712, the path area determination unit 404 calculates, from the current area 601 and the target area 602, the path area 603 that connects the two areas. The path area 603 is determined by calculating a group of block images that entirely covers an area defined by connecting the vertexes of the current area 601 with those of the target area 602.

In step S713, the display image generation unit 407 cuts image data of the target area 602 and that of the path area 603 from the low-resolution environment map 503 in the main memory 102 and performs a projective transformation on the respective pieces of image data.

In step S714, the display image generation unit 407 sequentially outputs display image data for the path area 603 and display image data for the target area 602 to the transmission unit 408. The display unit 201 performs control so as to display the pieces of display image data each having a low resolution on the display unit 201 in accordance with angle information.

In step S715, the needed resolution setting unit 405 calculates needed resolutions. A needed resolution for the target area 602 is determined in a manner similar to step S706. Calculation of a needed resolution for the path area 603 in step S715 will be described in detail below.

In step S716, the display image generation unit 407 refers to the needed resolutions obtained from the needed resolution setting unit 405 similarly to step S707 and determines whether display image data having a resolution higher than that of the low-resolution environment map needs to be generated. If it is determined that the display image data needs to be changed, the flow proceeds to step S717.

The process performed by the display image generation unit 407 from step S717 to step S719 is similar to that from step S708 to step S710.

In step S720, the current area determination unit 409 updates the position of the current area 601 on the basis of angle information ($\theta$, $\varphi$) transmitted from the geomagnetic sensor 204 of the HMD 105 at a predetermined interval and position information transmitted from the GPS sensor 205.

In step S721, the image processing apparatus 400 determines whether looking by using the HMD 105 ends. If looking ends, the process performed by the image processing apparatus 400 ends. If looking continues, the flow returns to step S705, and display image data is generated in accordance with a motion of the viewer's head.

Figure 8:
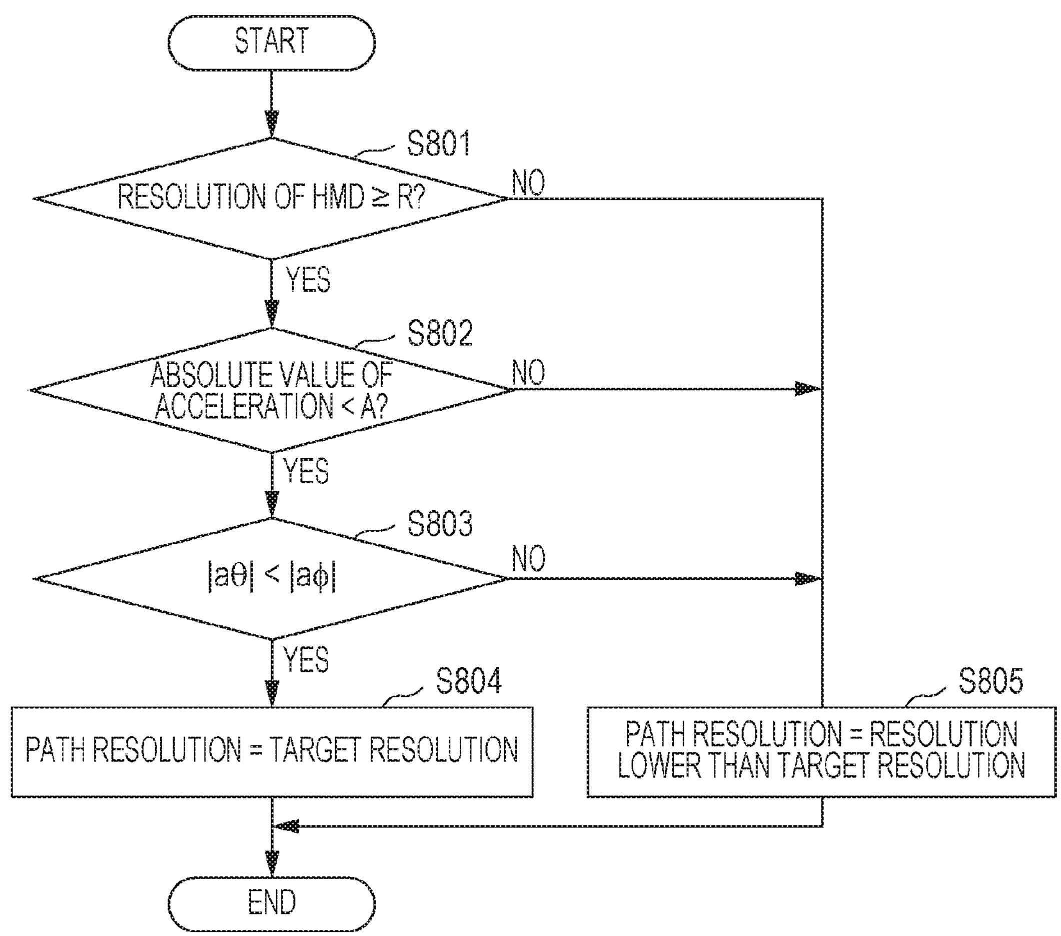
FIG. 8 is a flowchart of a resolution selection process in a case of look-ahead.

FIG. 8 is a flowchart of a process of calculating a needed resolution performed by the needed resolution setting unit 405 in S715. In step S801, it is determined whether the resolution of the display unit 201 of the HMD 105 is equal to or higher than a predetermined threshold R. If the resolution of the display unit 201 is equal to or higher than the threshold R, the flow proceeds to step S802. If the resolution of the display unit 201 is lower than the threshold R, the flow proceeds to step S805.

In step S802, it is determined whether the absolute value of the acceleration is smaller than a predetermined threshold A on the basis of the acceleration information ($a\theta$, $a\varphi$) obtained from the HMD 105. In a case where a motion of the head is rapid, it is inferred that the viewer is less likely to be able to visually recognize, as an image, a path area that extends until the viewer's line-of-sight is aligned with a direction in which the viewer has looked. Therefore, if the absolute value of the acceleration is equal to or larger than the threshold A, the flow proceeds to step S805, and a relatively low resolution is set for the path area. In step S802, if the absolute value of the acceleration is smaller than the threshold A, the flow proceeds to step S803.

In step S803, the magnitude of $a\theta$ is compared with that of $a\varphi$. If the magnitude of $a\varphi$ is smaller than that of $a\varphi$, the flow proceeds to step S804. If the magnitude of $a\theta$ is equal to or larger than that of $a\varphi$, the flow proceeds to step S805. In step S804, the same resolution as that corresponding to the target area 602 is set as the resolution for the path area 603. That is, as the resolution for the path area 603, the highest resolution is selected from among those of the environment maps at which display on the display unit 201 is possible. In step S805, as the resolution for the path area 603, a resolution that is one level lower than the resolution corresponding to the target area 602 is set. For example, in this embodiment, in a case where the same resolution as that of the high-resolution environment map 501 is selected for the target area 602, the same resolution as that of the medium-resolution environment map 502 is selected as the needed resolution for the path area 603. This takes into consideration the fact that a human head has a wider range of motion in the $\theta$ direction, and therefore, look-ahead of a wider area is needed. That is, in a case where the head moves largely in the $\theta$ direction, the size of display image data to be generated becomes larger, and the data volume is reduced by making the resolution lower.

As described above, according to this embodiment, an area to be observed by the viewer who is wearing the HMD 105 is predicted, and display image data is generated. The display image data that is generated on the basis of the prediction is generated prior to an image that is displayed on the display unit 201 of the HMD 105, and therefore, the display unit 201 can display a high-resolution image in real time in accordance with a motion of the viewer.

Second Embodiment

In the first embodiment, the form has been described in which display image data generated by the image processing apparatus 400 is displayed on the display unit 201 of the HMD 105 as needed. In a second embodiment, a method for caching (temporarily storing in the main memory 102) and deleting look-ahead image data of the target area 602 will be described. Note that the same components as those in the first embodiment are assigned the same reference numerals, and descriptions thereof will be omitted.

Figure 9C:
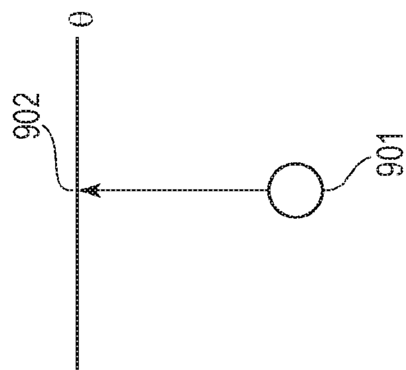
FIGS. 9A to 9C illustrate diagrams for describing motion characteristics of a human head.
Figure 9B:
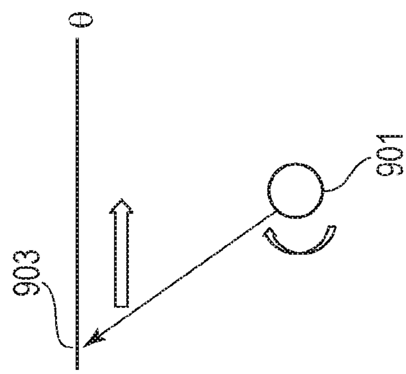
Figure 9A:
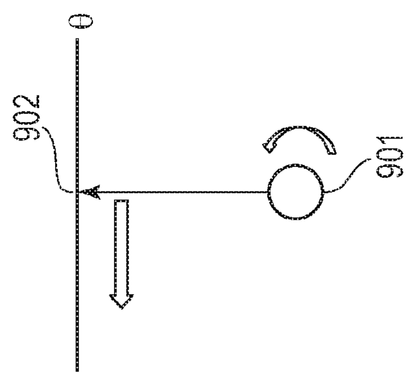

FIGS. 9A to 9C illustrate diagrams for describing motion characteristics of a human head. It is assumed that a head 901 initially faces a viewpoint position 902. Next, the head 901 rotates in the $\theta$ direction and the viewpoint position moves to a viewpoint position 903, as illustrated in FIG. 9B. When the viewpoint position reaches a position where the neck is unable to turn further, the head 901 is highly likely to rotate backward, and the viewpoint position returns to the original viewpoint position 902, as illustrated in FIG. 9C, which represents the characteristics of a human head. In this embodiment, a cache method for image data which utilizes such motion characteristics will be described.

Figure 10:
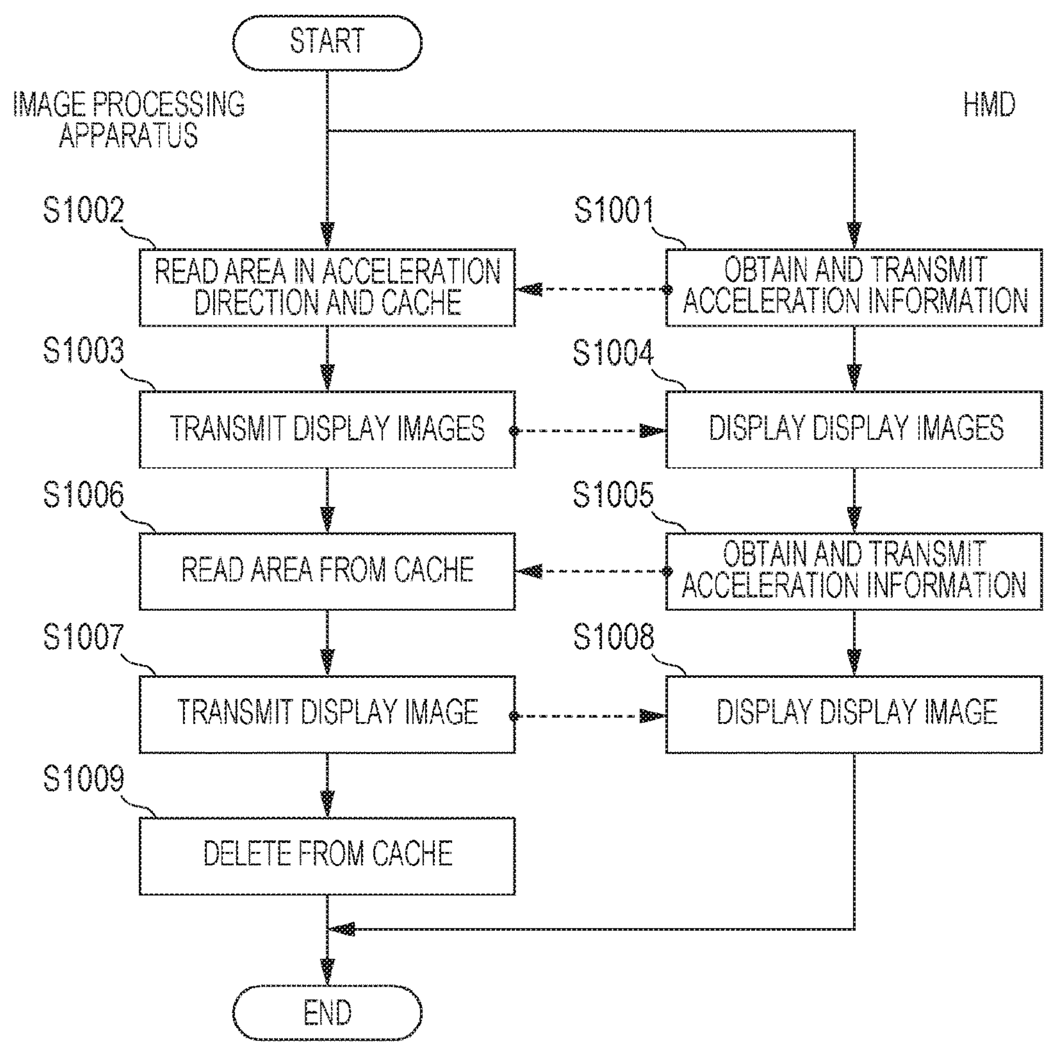
FIG. 10 is a flowchart of an environment map display process associated with a movement.

FIG. 10 is a flowchart illustrating the entire process in the second embodiment. In step S1001, the image processing apparatus 400 obtains acceleration information detected by the acceleration sensor 203 from the HMD 105.

In step S1002, the image processing apparatus 400 performs the process from step 701 to step S704 in accordance with angle information to thereby generate display image data for the current area 601 that the viewer is looking at. The image processing apparatus 400 generates display image data for the target area 602 and display image data for the path area 603 in accordance with the acceleration directions by performing the process from step S711 to step S719 in accordance with the acceleration information and caches the pieces of display image data in the main memory 102. The image processing apparatus 400 retains the pieces of display image data in the main memory 102 at least until the direction indicated by acceleration information obtained from the HMD 105 is reversed, that is, until acceleration information indicating the reverse direction is input. The image processing apparatus 400 transfers the pieces of display image data corresponding to the respective areas to the HMD 105 sequentially in step S1003, and the display unit 201 displays the pieces of display image data in the order of reception in step S1004. At this time, the pieces of display image data remain stored in the main memory 102.

In step S1005, the HMD 105 obtains new acceleration information and transfers the new acceleration information to the image processing apparatus 400. In step S1006, the image processing apparatus 400 generates display image data on the basis of the acceleration information obtained from the HMD 105. The process for calculating the target area, path area, and needed resolution is performed in a similar manner to the first embodiment. However, in a case where display image data that is to be generated has been cached in the main memory 102, the image processing apparatus 400 reads the display image data from the main memory 102 without newly performing cutting from an environment map and a projective transformation. In a case where the display image data that is to be generated has not been saved in the main memory 102, the image processing apparatus 400 generates display image data corresponding to the target area and that corresponding to the path area similarly to the first embodiment. In step S1008, the display image data is displayed on the display unit 201 of the HMD 105. In step S1009, the image processing apparatus 400 deletes the display image data from the main memory 102.

As described above, by taking into consideration a possibility that display image data which has been generated is looked at again in accordance with motion characteristics of a human head, display image data generated by look-ahead is cached. As a result, it is possible to display a high-resolution image in real time in accordance with a motion of the viewer in a more real-time manner with a lower processing load.

Third Embodiment

In the second embodiment, the method for controlling display image data in accordance with motion characteristics of a human head has been disclosed. In a third embodiment, a process for switching between environment maps in accordance with a movement (walk) of the viewer will be described. Note that the same components as those in the first embodiment are assigned the same reference numerals, and descriptions thereof will be omitted.

Figure 11:
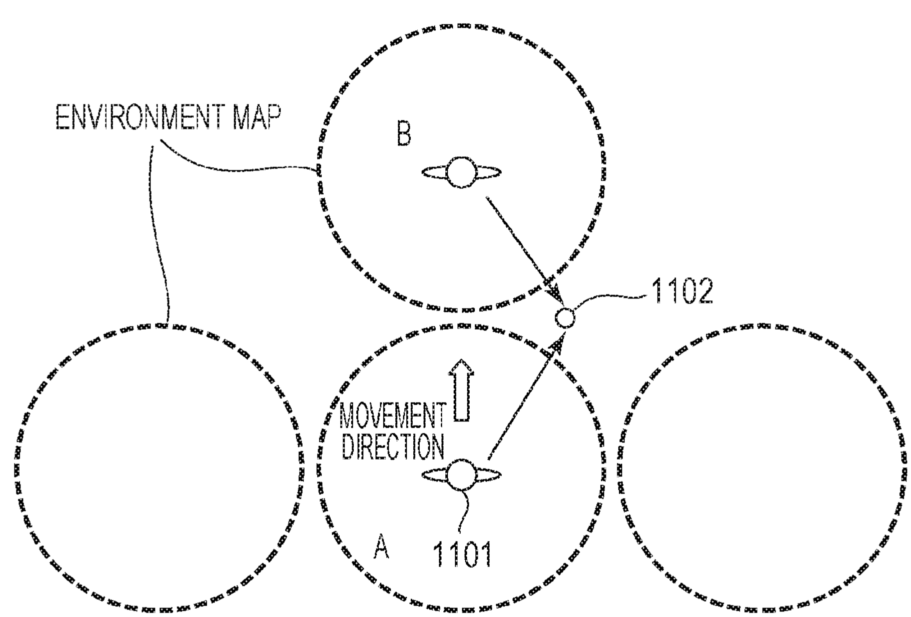
FIG. 11 is a schematic diagram for describing a method for switching between environment maps in accordance with a walk of a human being.

FIG. 11 is a schematic diagram for describing a method for switching between environment maps in accordance with a walk of a human being. It is assumed that a viewer 1101 initially observes an environment map A. In a case where the viewer 1101 moves forward, a scene observed by the viewer 1101 needs to be changed. Accordingly, it is necessary to switch from the environment map A to an environment map B. Here, a case is considered where the viewer 1101 walks while fixing their eyes on a fixation point 1102. As described in the above-described embodiments, in a case of looking at an image in the same line-of-sight direction, display image data generated on the basis of a low-resolution environment map is initially displayed, and the display image data is thereafter switched to display image data generated on the basis of a high-resolution environment map. The viewer 1101 has already observed the environment map A having a high resolution, and therefore, the viewer 1101 experiences an uneasy feeling upon switching to new low-resolution display image data of the environment map B on the basis of position information and angle information as a result of walking. Accordingly, a method for relieving such an experience of an uneasy feeling is needed.

Figure 12:
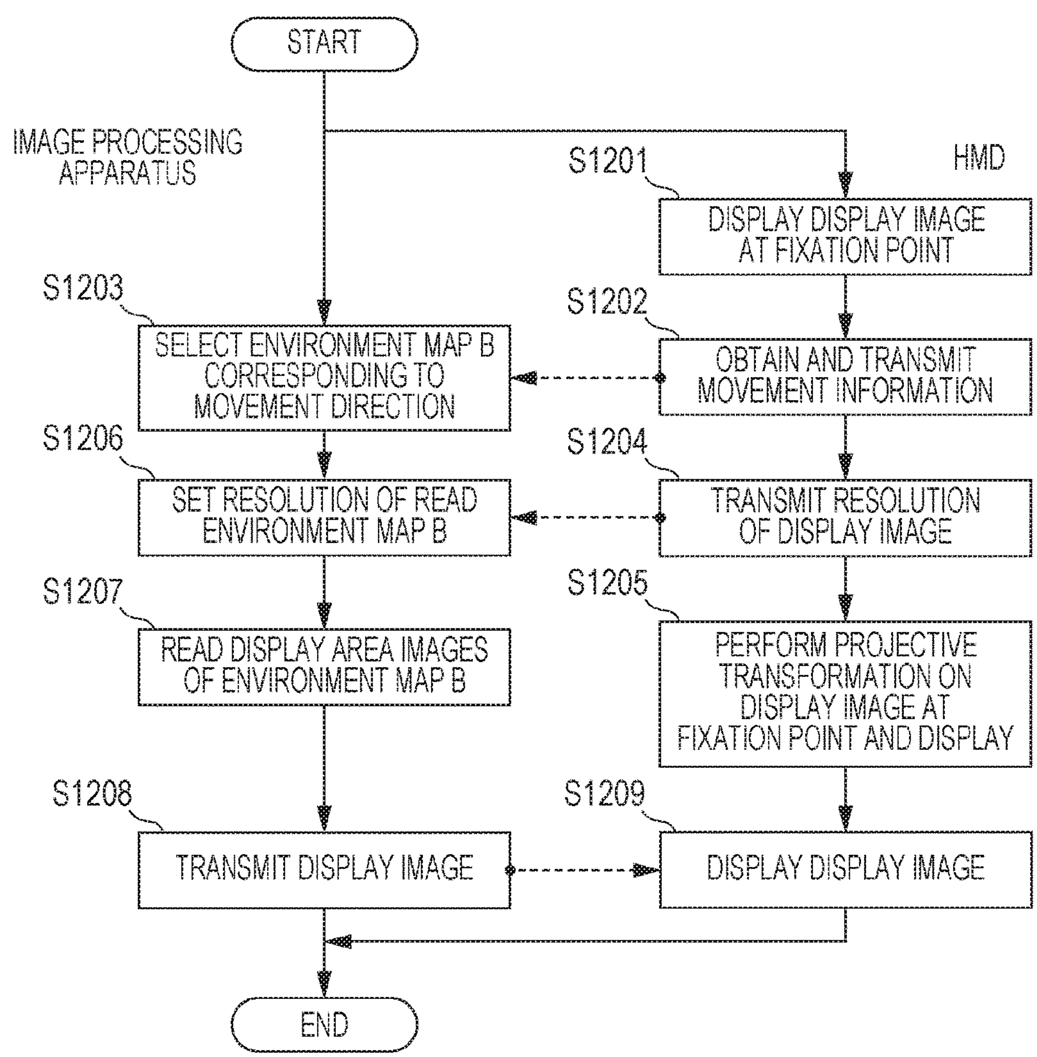
FIG. 12 is a flowchart of an environment map look-ahead process.

FIG. 12 is a flowchart illustrating the entire process in the third embodiment. In step S1201, the display unit 201 of the HMD 105 is displaying display image data generated on the basis of the environment map A having a high resolution at the fixation point 1102. In step S1202, the HMD 105 detects the viewer 1101 walking in accordance with acceleration information from the acceleration sensor 203, angle information from the geomagnetic sensor 204, and position information from the GPS sensor 205 and transmits, as motion information, movement information about the viewer 1101 to the image processing apparatus 400.

In step S1203, the image processing apparatus 400 selects the environment map B that corresponds to the position of the viewer 1101 after moving in accordance with the movement information (direction and distance). In step S1204, the HMD 105 transmits to the image processing apparatus 400 the resolution of the environment map A that is currently displayed at the fixation point 1102. In step S1205, the HMD 105 performs a projective transformation on display image data generated on the basis of the environment map A that is currently displayed at the fixation point 1102 in accordance with the movement information about the viewer 1101 under control of a CPU and displays the result. On the other hand, in step S1206, the image processing apparatus 400 sets the resolution of the environment map B that is read in accordance with the resolution at which the HMD 105 is performing display. In step S1207, the image processing apparatus 400 reads from the storage device 103 block images of the current area that is centered around the fixation point 1102 of the environment map B having the resolution that has been set in S1206 and loads the block images to the main memory 102. In step S1208, the display image generation unit 407 of the image processing apparatus 400 performs a projective transformation on the image data of the current area which has been read and generates display image data. In step S1209, the display unit 201 of the HMD 105 displays the display image data generated in step S1208.

As a result, even if a viewer moves, it is possible to display a high-resolution image in real time without the viewer experiencing an uneasy feeling due to a change in the resolution. Further, in a case where an environment map corresponding to the viewpoint position changes due to a change in the position of the viewer, it is possible to generate higher-resolution image data efficiently.

Other Embodiments

In the embodiments described above, the example has been described where the acceleration of the viewer's head is detected by using the acceleration sensor mounted on the HMD 105 in order to detect a motion of the head (or the line-of-sight) of the viewer, and acceleration information is used. However, the method for obtaining motions of the viewer is not limited to this. For example, a method of detecting the speed of the moving head instead of the acceleration may be used, or information expressed by a vector may be used as information indicating a motion of the head instead of the acceleration information ($a\theta$, $a\varphi$).

The present invention can be implemented as a process in which a program that implements one or more functions in the above-described embodiments is supplied to a system or an apparatus via a network or a storage medium, and one or more processors of a computer of the system or the apparatus read and execute the program. Alternatively, the present invention can be implemented as a circuit (for example, ASIC) that implements one or more functions.

According to the present invention, it is possible to more naturally display image data in accordance with a motion of a viewer.

While exemplary embodiments have been described, it is to be understood that the scope of the claims is not limited to the disclosed exemplary embodiments. Instead, the scope of the following claims encompasses all applicable modifications and equivalent structures and functions.

This application claims priority to International Patent Application No. PCT/JP20141082982, which was filed on Dec. 12, 2014 and which is hereby incorporated by reference in its entirety.

The invention claimed is:

1. An image processing apparatus for displaying image data in accordance with a line-of-sight direction of a viewer, the image processing apparatus comprising:
- one or more processors; and
- one or more computer-readable media that are coupled to the one or more processors,
- wherein the one or more computer-readable media store a plurality of environment maps having different resolutions, and
- wherein the one or more computer-readable media store instructions for
  - obtaining information indicating a motion of a viewer as motion information;
  - retaining a current area that is being displayed to the viewer;
  - determining a target area on the environment maps on the basis of the current area and the motion information, wherein the target area is an area where the motion of the viewer is predicted to stop;
  - determining as a path area an area that includes a path, from the current area to the target area, along which a line-of-sight direction of the viewer changes;
  - setting resolutions that respectively correspond to the path area and the target area among the resolutions of the plurality of environment maps;
  - reading pieces of image data that respectively correspond to the path area and the target area from the environment maps, of the plurality of environment maps, having the set resolutions; and
  - generating image data for display in the path area and image data for display in the target area.

2. The image processing apparatus according to claim 1, wherein the one or more computer-readable media store instructions for setting the resolution that corresponds to the path area on the basis of a magnitude of a speed of the motion of the viewer obtained from the motion information.

3. The image processing apparatus according to claim 1, wherein the motion information includes acceleration information formed of information indicating an acceleration in a lateral direction and information indicating an acceleration in a vertical direction, and
- wherein the one or more computer-readable media store instructions for setting, as the resolution that corresponds to the path area, a first resolution in a case where the acceleration in the vertical direction is larger than the acceleration in the lateral direction, or a second resolution that is lower than the first resolution in a case where the acceleration in the lateral direction is larger than the acceleration in the vertical direction.

4. The image processing apparatus according to claim 3, wherein the one or more computer-readable media store instructions for
- retaining the image data until the motion information indicates a motion in a reverse direction.

5. The image processing apparatus according to claim 1, wherein the path area is narrow in a lateral direction and is wide in a vertical direction.

6. The image processing apparatus according to claim 1, wherein the one or more computer-readable media store instructions for storing in advance a highest resolution at which a display device is able to display the image data, and setting the highest resolution as a resolution that corresponds to the target area.

7. The image processing apparatus according to claim 1, wherein the one or more computer-readable media store instructions for
- obtaining, as the motion information, movement information that indicates information about a movement of the viewer, and
- switching between environment maps for reading in accordance with the movement information.

8. The image processing apparatus according to claim 1, wherein the one or more computer-readable media store instructions for determining the target area based on an operation range of a head of the viewer.

9. The image processing apparatus according to claim 1, wherein the one or more computer-readable media store instructions for determining the target area further based on an amount of movement from center coordinates of the current area.

10. The image processing apparatus according to claim 9,
- wherein the motion information describes an acceleration in a lateral direction and an acceleration in a vertical direction, and
- wherein center coordinates of the target area can be described by $$(\theta_t,\varphi_t)=(\theta_c,\varphi_c)+\tfrac{1}{2}(a\theta,a\varphi)\times\Delta t^2,$$

where ($\theta_c$, $\varphi_c$) are the center coordinates of the current area, where $a\theta$ is the acceleration in the lateral direction, where $a\varphi$ is the acceleration in the vertical direction, where $\Delta t$ is a period of time, and where ($\theta_t$, $\varphi_t$) are the center coordinates of the target area.

11. A non-transitory computer-readable medium that stores a computer program that, when executed by one or more computers, causes the one or more computers to:
- obtain information indicating a motion of a viewer as motion information;
- retain a current area that is being displayed to the viewer;
- determine a target area on a plurality of environment maps on the basis of the current area and the motion information, wherein the plurality of environment maps are stored in a storage device, and wherein the target area is an area where the motion of the viewer is predicted to stop;

determine as a path area an area that includes a path, from the current area to the target area, along which a line-of-sight direction changes;

set resolutions that respectively correspond to the path area and the target area among resolutions of the plurality of environment maps, the resolutions of the plurality of environment maps being different from one another;

read pieces of image data that respectively correspond to the path area and the target area from environment maps, of the plurality of environment maps, having the set resolutions; and generate image data for display in the path area and image data for display in the target area.

12. The non-transitory computer-readable medium of claim 11, wherein the motion information includes information that indicates an acceleration in a lateral direction and information that indicates an acceleration in a vertical direction, and wherein the resolution that corresponds to the path area is a first resolution in a case where the acceleration in the vertical direction is larger than the acceleration in the lateral direction and is a second resolution that is different from the first resolution in a case where the acceleration in the lateral direction is larger than the acceleration in the vertical direction.

13. The non-transitory computer-readable medium of claim 11, wherein the path area is narrow in a lateral direction and is wide in a vertical direction.

14. The non-transitory computer-readable medium of claim 11, wherein the computer program, when executed by one or more computers, further causes the one or more computers to retain the image data until the motion information indicates a motion in a reverse direction.

15. The method of claim 11, wherein the path area is narrow in a lateral direction and is wide in a vertical direction.

16. The method of claim 11, further comprising retaining the image data until the motion information indicates a motion in a reverse direction.

17. An image processing method for displaying image data in accordance with a line-of-sight direction of a viewer, comprising:

obtaining information indicating a motion of a viewer as motion information;

retaining a current area that is being displayed to the viewer;

determining a target area on a plurality of environment maps on the basis of the current area and the motion information, wherein the plurality of environment maps are stored in storage means, and wherein the target area is an area where the motion of the viewer is predicted to stop;

determining as a path area an area that includes a path, from the current area to the target area, along which a line-of-sight direction changes;

setting resolutions that respectively correspond to the path area and the target area among resolutions of the plurality of environment maps, the resolutions of the plurality of environment maps being different from one another; and reading pieces of image data that respectively correspond to the path area and the target area from environment maps, of the plurality of environment maps, having the resolutions set by the setting of the resolutions, and generating image data for display in the path area and image data for display in the target area.

18. The method of claim 17, wherein the motion information includes information that indicates an acceleration in a lateral direction and information that indicates an acceleration in a vertical direction, and wherein the resolution that corresponds to the path area is a first resolution in a case where the acceleration in the vertical direction is larger than the acceleration in the lateral direction and is a second resolution that is different from the first resolution in a case where the acceleration in the lateral direction is larger than the acceleration in the vertical direction.

* * * * *